United States Patent [19]

Okamoto et al.

[11] Patent Number: 4,804,707
[45] Date of Patent: Feb. 14, 1989

[54] IMPACT RESISTANT RESIN COMPOSITION

[75] Inventors: Takashi Okamoto; Kenji Yasue; Takeshi Marutani; Yasumasa Fukushima, all of Uji, Japan

[73] Assignee: Unitika Ltd., Amagasaki-City, Japan

[21] Appl. No.: 42,275

[22] Filed: Apr. 24, 1987

[30] Foreign Application Priority Data

May 24, 1986 [JP] Japan ................................ 61-119585
May 30, 1986 [JP] Japan ................................ 61-127063

[51] Int. Cl.$^4$ ...................... C08L 67/02; C08L 77/02; C08L 77/06
[52] U.S. Cl. ........................................ 525/66; 525/68; 525/132; 525/152
[58] Field of Search ................... 525/66, 132, 176, 68, 525/152

[56] References Cited

U.S. PATENT DOCUMENTS

| | | | |
|---|---|---|---|
| 4,172,859 | 10/1979 | Epstein | 525/176 |
| 4,187,358 | 2/1980 | Kyo | 525/132 |
| 4,348,500 | 9/1982 | Robeson | 525/65 |

FOREIGN PATENT DOCUMENTS

| | | | |
|---|---|---|---|
| 227053 | 7/1987 | European Pat. Off. | |
| 55-021430 | 2/1980 | Japan | 525/64 |
| 61-026657 | 2/1986 | Japan | 525/176 |
| 61-183353 | 8/1986 | Japan | |

OTHER PUBLICATIONS

Patent Abstracts of Japan, unexamined applications, C field, vol. 9, No. 188, Aug. 3, 1985, The Patent Office of Japanese Government, p. 7, C. 295.

Patent Abstracts of Japan, unexamined applications, C field, vol. 10, No. 85, Apr. 4, 1986, The Patent Office Japanese Government, p. 4, C. 336.

Patent Abstracts of Japan, unexamined applications, C field, vol. 4, No. 144, Oct. 11, 1980, The Patent Office Japanese Government, p. 86, C. 27.

*Primary Examiner*—Patricia Short
*Attorney, Agent, or Firm*—Oblon, Fisher, Spivak, McClelland & Maier

[57] ABSTRACT

A resin composition which comprises a resin blend comprising from 10 to 70% by weight of a polyarylate and from 30 to 90% by weight of a polyamide, and (A) an epoxy group-containing olefin copolymer obtained by copolymerizing at least one unsaturated glycidyl monomer with at least one olefin unsaturated monomer and (B) an acid anhydride-containing olefin copolymer obtained by copolymerizing a polyolefin or an olefin copolymer with an unsaturated dicarboxylic anhydride, incorporated in a total amount of form 3 to 30% by weight to said resin blend.

9 Claims, No Drawings

IMPACT RESISTANT RESIN COMPOSITION

The present invention relates to a novel resin composition having exellent impact strength and good chemical and thermal properties and moldability. More particularly, it relates to a resin composition obtained by incoporating an epoxy group-containing olefin copolymer and an acid anhydride-containing olefin copolymer to a resin blend comprising a polyarylate and a polyamide. The resin composition of the present invention is expected to be used for automobile parts, particularly exterior plates or external parts of automobiles and for general mechanical parts, by virtue of its excellent impact resistance, chemical resistance, heat resistance, and moldability.

A resin composition comprising a polyarylate and a polyamide, or a polyarylate, a polyamide and a polyester, is known. For example, Japanese Examined Patent Publication No. 50260/1983 discloses the properties of a three component resin composition comprising a polyarylate, a polyamide and a polyester or a polyester ether. Further, Japanese Unexamined Patent Publications No. 100552/1977 and No. 100553/1977 disclose processes for its production. Japanese Unexamined Patent Publication No. 94366/1978 discloses a method for imparting flame retardancy thereto.

A resin composition comprising a polyarylate and a polyamide (if necessary, further containing a polyester or a polyeter ether) is excellent not only in the chemical resistance and heat resistance, but also in the moldability, and it is used primarily in the electric and electronic fields.

The polyarylate obtainable from bisphenol A and a phthalic acid mixture comprising terephthalic acid and isophthalic acid, has excellent heat resistance, but as is well known, its chemical resistance is not adequate and environmental stress cracks are likely to form. Further, its moldability is not good. However, for instance, a resin composition comprising 30% by weight of this polyarylate, 50% by weight of nylon 6 and 20% by weight of a polyethylene terephthalate, has excellent chemical resistance, and its heat distortion temperature is also high at a level of 160° C. The moldability is about ten times superior to the polyarylate alone, as evaluated by a spiral flow tester. By virtue of such properties, this resin composition is widely used in the electric and electronic fields.

However, the impact strength of the resin composition comprising a polyarylate and a polyamide (optionally further containing a polyester or a polyester ether) is not necessarily adequate. For instance, in the case of a resin composition comprising 50% by weight of a polyarylate and 50% by weight of nylon 6, the Izod impact strength is 7 kg.cm/cm, which is relatively low for an engineering plastic. Therefore, its use has been rather limited. For example, when the resin composition is used for an external plate or exterior part of an automobile, the Izod impact strenght is required to be at least 20 kg.cm/cm. Under these circumstances, the application of said resin to an external plate or exterior part of an automobile has been hindered by the inadequate impact resistance in spite of the excellent chemical resistance, heat resistance and moldability. Therefore, it has been expected that if the impact resistance of said resin composition can be improved, its application will remarkably expand not only in the field of external plates for exterior parts for automobiles but also in other fields.

Nevertheless, there has been no substantial attempt to improve the impact resistance of said resin composition. It has been proposed to incorporate an elastomer in Japanese Unexamined Patent Publication No. 56652/1979, to incorporate an ionomer in Japanese Unexamined Patent Publication No. 93043/1974, to incorporate a sulfonic acid group-containing polyethyleneterephthalate in Japanese Unexamined Patent Publication No. 105050/1984 or to incorporate an olefin copolymer of a glycidyl ester of an $\alpha,\beta$-unsaturated acid in Japanese Unexamined Patent Publication No. 183353/1986. However, it has been found that the resin compositions having such an elastomer, ionomer or sulfonic acid group-containing polyethyleneterephthalate incorporated, are not practically useful because the mechanical anisotropy of the molded products is substantial. Whereas, in the case of the resin composition having an olefin copolymer of a glycidyl ester of an $\alpha,\beta$-unsaturated acid incorporated, if such an olefin copolymer is blended in a substantial amount to obtain a sufficient impact strength, the resin composition is likely to undergo gelation, coloring or decomposition. Thus, this resin composition is also not practically useful.

On the other hand, with respect to a polyamide, it is known to incorporate an olefin polymer containing an acid anhydride. However, if the olefin polymer is blended in a substantial amount, the resin composition tends to undergo phase separation, whereby not only the gloss of the molded product tends to be inferior, but also it tends to be difficult to obtain the intended impact strength.

Thus, from the practical viewpoint, such attempts have all failed in improving the impact resistance of the resin composition.

Under the circumstances, it is an object of the present invention to improve the impact strength of a resin composition comprising a polyarylate and a polyamide without impairing its excellent chemical resistance, heat resistance and moldability.

It is another object of the present invention to provide a novel molding material which is capable of providing a molded product having exellent gloss as well as excellent chemical resistance, heat resistance, moldability and impact resistance.

A further object of the present invention is to provide a novel molding material which provides excellent productivity and which is excellent in the practical use.

The present inventors have conducted extensive research with such objects, and as a result, have unexcectedly found that all the objects of the present invention can be satisfied by a resin composition obtained by incorporating an epoxy group-containing olefin copolymer and an acid anhydride-containing olefin copolymer to a resin composition comprising a polyarylate and a polyamide. When the epoxy group-containing olefin copolymer and the acid anhydride-containing olefin copolymer are used alone independently, there will be various drawbacks such that in some cases, no adequate impact strength will be obtained; in other cases, gelation, coloring, decomposition or phase separation will take place, or the gloss of the molded product will be inferior. It is surprising that when these materials are used in combination, such drawbacks can be all solved, and yet the impact strength can be improved over the case where these materials are used independently.

Namely, the present invention provides a resin composition which comprises a resin blend comprising from 10 to 70% by weight of a polyarylate and from 30 to 90% by weight of a polyamide, and (A) an epoxy group-containing olefin copolymer obtained by copolymerizing at least one olefin unsaturated glycidyl monomer with at least one olefin unsaturated monomer and (B) an acid anhydride-containing olefin copolymer obtained by copolymerizing a polyolefin or an olefin copolymer with an unsaturated dicarboxylic anhydride, incorporated in a total amount of from 3 to 30% by weight to said resin blend.

Now, the present invention will be described in detail with reference to the preferred embodiments.

The polyarylate useful for the present invention is obtained from a bisphenol of the formula:

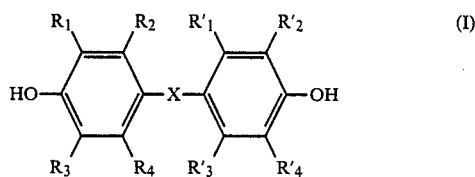

wherein —X— is selected from the group consisting of —O—, —S—, —SO$_2$—, —CO—, an alkylene group and an alkylidene group, each of $R_1$, $R_2$, $R_3$, $R_4$, $R'_1$, $R'_2$, $R'_3$ and $R'_4$ is selected from the group consisting of a hydrogen atom, a halogen atom and a hydrocarbon group, and terephthalic acid and/or isophthalic acid, or a functional derivative thereof.

Sepecific examples of the bisphenol of the formula I include 4,4′-dihydroxy-diphenyl ether, bis(4-hydroxy-2-methylphenyl) ether, bis(4-hydroxy-3-chlorophenyl) ether, bis(4-hydroxyphenyl) sulfide, bis(4-hydroxyphenyl) ketone, bis(4-hydroxyphenyl)methane, bis(4-hydroxyphenyl-3-methylphenyl)methane, bis(4-hydroxy-3,5-dichlorophenyl)methane, bis(4-hydroxy-3,5-dibromophenyl)methane, bis(4-hydroxy-3,5-difluorophenyl)-methane, 1,1-bis(4-hydroxyphenyl)ethane, 2,2-bis(4-hydroxy-3-methylphenyl)propane, 2,2-bis(4-hydroxy-3chlorophenyl)propane, 2,2-bis(4-hydroxy-3,5-dichlorophenyl)propane, 2,2-bis(4-hydroxy-3,5-dibromophenyl)propane, 1,1-bis(4-hydroxyphenyl)butane, bis(4-hydroxyphenyl)phenylmethane, bis(4-hydroxyphenyl)diphenylmethane, bis(4-hydroxyphenyl)-4′-methylphenylmethane, 1,1-bis(4-hydroxyphenyl)-2,2,2-trichloroethane, bis(4-hydroxy-phenyl)-4′(chlorophenyl)methane, 1,1-bis(4-hydroxyphenyl)cyclohexane, bis(4-hydroxyphenyl)cyclohexylmethane, and 2,2-bis(4-hydroxynaphthyl)propane. However, a typical bisphenol which is most commonly employed is 2,2-bis(4-hydroxyphenyl)propane i.e. so-called bisphenol A. If required, a mixture of the above-mentioned bisphenols, or a mixture of such a bispnenol with a small amount of other bivalent compound, such as 2,2′-dihydroxy diphenyl, a dihydroxynaphthalene such as 2,6-dihydroxynaphtalene, hydroquinone, resorcinol, 2,6-dihydroxychlorobenzene, 2,6-dihydroxytoluene, or 3,6-dihydroxytoluene, may be used. The functional derivative of terephthalic acid or isophthalic acid includes a halide and an alkyl or aryl ester of such acids. The phenylene group of the terephthalic acid or isophthalic acid, or the functional derivative thereof, to be used in the present invention, may be substituted by one or more halogen atoms or alkyl groups. Further, in addition to the terephthalic acid or isophthalic acid, or the functional derivative thereof, a small amount of other organic or aliphatic dicarboxylic acid or a functional derivative thereof may be used as a copolymer component.

The polyarylate useful for the present invention can be prepared by any optional method such as interfacial polymerization, solution polymerization or melt polymerization. In order to obtain a resin composition having desirable physical properties, it is preferred to employ a polyarylate having an average molecular weight of from 5,000 to 10,000.

The polyamide useful for the present ivention is represented by the formula:

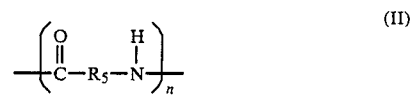

or the formula:

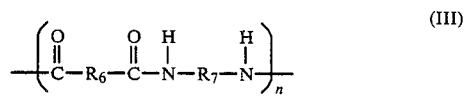

wherein each of $R_5$, $R_6$ and $R_7$ is a phenylene group or an alkylene group, and n is an integer of at least 20. The polyamide useful for the present invention includes polymers obtained by the condensation reaction of a diamine with a dibasic acid, by the self-condensation of amino acids and by the polymerization reaction of a lactam.

The polyamide useful for the present invention may be any one of those represented by the above formulas. However, preferred polyamides are nylon 4,6, nylon 6, nylon 6,6, nylon 6,10, nylon 11 and nylon 12. The polyamide to be used in the present invention may be a copolymer of two or more components. For example, it may be a copolymer of terephthalic acid and/or isophthalic acid with 2,2,4-tri-methylhexamethylenediamine and/or 2,4,4-trimethylhexamethylenediamine, or a copolymer of terephthalic acid and/or isophthalic acid with bis(4-amino-3-methylcyclohexyl)methane and caprolactam and/or lauryllactam. Further, the polyamide to be used in the present invention may be of a single type or may be a mixture of two or more different kinds.

The most suitable polyamide for use in the present invention is one member or a mixture of two or more members selected from the group consisting of nylon 6, nylon 6,6, and nylon 4,6.

In order to obtain a resin composition having desirable physical properties, it is preferred to employ a polyamide having an average molecular weight of from 5,000 to 10,000.

The epoxy group-containing olefin copolymer to be used in the present invention is obtained by polymerizing at least one unsaturated glycidyl monomer with at least one olefin monomer. The type of the copolymer may be any one of a random copolymer, a block copolymer, a graft copolymer and an alternate copolymer.

The unsaturated glycidyl monomer is a monomer having in its molecule an unsaturated bond copolymerizable with an olefin monomer and at least one epoxy group. Such an unsaturated glycidyl monomer includes, for example, an unsaturated glycidyl ether of the formula:

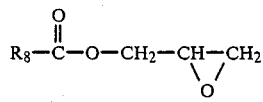

wherein $R_8$ is a hydrocarbon group having an olefin unsaturated bond; an unsaturated glycidyl ether of the formula:

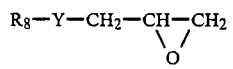

wherein $-Y-$ is $-CH_2-O-$ or

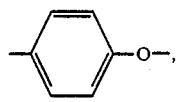

and $R_8$ is as defined with respect to the formula IV; and an epoxy alkene of the formula:

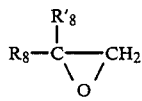

wherein $R_8$ is as defined with respect to the formula IV, and $R'_8$ is a hydrogen atom, a halogen atom or a hydrocarbon group.

Specifically, there may be mentioned glycidyl acrylate, glycidyl methacrylate, monoglycidyl itaconate, diglycidyl itaconate, monoglydicyl butenetricarboxylate, diglycidyl butnetricarboxylate, triglycidyl butenetricarboxylate, glycidyl p-styrenecarboxylate, allylglycidyl ether, 2-methylallylglycidyl ether, styrene-p-glycidyl ether, p-glycidylstyrene, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene and vinyl cyclohexene monoxide.

In the present invention, the olefin monomer copolymerized with the unsaturated glycidyl monomer to form an olefin copolymer may be any olefin monomer so long as it is capable of introducing an epoxy group to the molecule. However, it is preferably an olefin such as ethylene, propylene, butene-1, isobutylene, decene-1, octacene-1 or styrene; a vinyl ester such as vinyl acetate, vinyl propionate or vinyl benzoate; an ester of acrylic acid or methacrylic acid with a saturated alcohol such as methyl alcohol, ethyl alcohol, propyl alcohol, butyl alcohol, 2-ethylhexyl alcohol, cyclohexyl alcohol, dodecy alchol or octadecyl alcohol; a diester of maleic acid; a vinyl ether such as vinyl methyl ether or vinyl ethyl ether; an N-vinyl lactam such as N-vinyl pyrrolidone or N-vinyl caprolactam; or an acrylic acid amide compound. These olefin monomers, may be used alone or in combination as a mixture of two or more different kinds.

As the epoxy group-containing olefin copolymer for use in the present invention, an ethylene-glycidyl methacrylate copolymer, an ethylene-glycidyl acrylate copolymer, an ethylene-glycidyl methacrylate copolymer, an ethylene-glycidyl methacrylate-vinyl acetate copolymer and an ethylene-glycidyl acrylate-vinyl acetate copolymer are particularly preferably used.

The copolymerization ratio of the unsaturated glycidyl monomer in the epoxy group-containing olefin copolymer to be used in the present invention is usually from 0.05 to 95 mol %, preferably from 0.1 to 50 mol %.

The acid anhydride-containing olefin copolymer for use in the present invention is obtained by the copolymerization of a polyolefin or an olefin copolymer with an unsaturated dicarboxylic acid anhydride.

The polyolefin or olefin copolymer for the present invention includes a homopolymer of an olefin such as polyethylene, polypropylene or polybutene-1; a polymer of a methacrylate such as methylmethacrylate, ethyl methacrylate, butyl mthacrylate, 2-ethylhexyl methacrylate or 2-hydroxyethyl methacrylate; a polymer of an acrylate such as ethyl acrylate, butyl acrylate, 2-ethylhexyl acrylate or 2-hydroxyethyl acrylate; and a copolymer of different types of olefins or a copolymer of an olefin with an other type of a monomer such as acrylate, such as an ethylene-propylene copolymer an ethylene-butene-1 copolymer, a propylene-butene-1 copolymer, an ethylene-vinyl acetate copolymer or an ethylene-propylene-diene copolymer. The type of the copolymer may be any one of a random copolymer, a block copolymer, a graft copolymer and an alternate copolymer.

The unsaturated dicarboxylic acid anhydride for the present invention includes an α,β-unsaturated dicarboxylic acid anhydride of the formula:

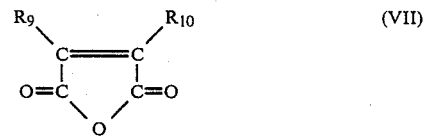

wherein each of $R_9$ and $R_{10}$ is a hydrogen atom, a halogen atom or a hydrocarbon group, and an alicyclic carboxylic acid anhydride having a cis-form double bond in the ring.

Specific examples of the α,β-unsaturated dicarboxylic acid anhydride of the formula VII includes maleic anhydride, methylmaleic anhydride, chloromaleic anhydride, citraconic anhydride, butynylsuccinic anhydride and tetrahydrophthalic anhydride.

The alicyclic carboxylic acid anhydride having a cis-form double bond in the ring includes anhydrides of cis-4-cyclohexene-1,2-dicarboxylic acid, endo-bicyclo-[2,2,1]-5-heptene-2,3-dicarboxylic acid, methyl-endo-cis-bicyclo-[2,2,1]-5-hexane-2,3-dicarboxylic acid and endo-bicyclo-[2,2,1]-1,2,3,4,7,7-hexachloro-2-heptene-5,6-dicarboxylic acid. If necessary, their functional derivatives such as dicarboxylic acids, metal salts of the dicarboxylic acids, esters, amides or acid halides may also be employed in combination.

As the acid anhydride-containing olefin copolymer to be used in the present invention, a copolymer or a graft adduct of maleic anhydride or endo-bicyclo-[2,2,1]-5-heptene-2,3-dicarboxylic anhydride to an ethylene-propylene copolymer, an ethylene-butene-1 copolymer, an ethylene-vinyl acetate copolymer, an ethylene-propylene-diene copolymer, an ethylene-acrylate ester copolymer or an ethylene-methacrylate copolymer, is preferably employed.

The copolymerization ratio of the unsaturated dicarboxylic acid anhydride in the acid anhydride-containing olefin copolymer to be used in the present invention is usually from 0.05 to 95 mol %, preferably from 0.1 to 50 mol %.

Such an epoxy group-containing olefin copolymer or acid anhydride-containing olefin copolymer may be prepared by a conventional so-called radical copolymerization, or by a method wherein at least one unsaturated monomer containing an epoxy group or acid anhydride is radical-grafted to an olefin homopolymer or to an olefin copolymer in the presence of a radical-forming agent, in the presence or absence of a solvent or dispersing medium. In a case where the graft reaction is conducted in a molten state, it is possible to obtain the desired product in a simplified method in an extremely short period of time by using a melt kneading machine such as an extruder, kneader for a Banbary mixer.

The proportions of the polyarylate and the polyamide in the resin composition of the present invention are such that the polyarylate is from 10 to 70% by weight, and the polyamide is from 30 to 90% by weight. Most preferably, the polyarylate is from 30 to 60% by weight, and the polyamide is from 40 to 70% by weight.

The proportions of the epoxy group-containing olefin copolymer and the acid anhydride-cotaining olefin copolymer used in the resin composition of the present invention are such that the equivalent ratio of the epoxy group to the acid anhydride is within a range of from 1:9 to 9:1. The epoxy group-containing olefin copolymer and the acid anhydride-containing olefin copolymer are incorporated preferably in a total amount of from 3 to 30% by weight. If the amount is less than 3% by weight, the effect for the improvement of the impact strength is not remarkable. On the other hand, if the amount exceeds 30% by weight, the heat resistance tends to deteriorate.

To the resin composition of the present invention, additives such as a heat stabilizer, an antioxidant, a photostabilizer, a lubricant, a pigment, a flame retardant and a plasticizer, may further be incorporated. Further, a fiber reinforcing material such as glass fiber, metal fiber, potassium titanate whisker or carbon fiber, or a filler-type reinforcing material such as talc, calcium carbonate, mica, glass flake or metal flake may also be incorporated. It is particularly preferred to incorporate glass fiber in an amount of from 10 to 50% by weight to the resin composition of the present invention, whereby not only the mechanical strength and heat resistance can be substantially improved, but also an improvement in the water resistance can be obtained.

Now, the present invention will be described in further detail with reference to Examples. However, it should be understood that the present invention is by no means restricted to such specific Examples.

In the Examples, the physical properties were measured in accordance with the following methods.
Izod impact strength: ASTM D-256
Heat distortion temperature: ASTM D-648

EXAMPLES 1 to 8

1,000 parts by weight of an ethylene-propylene copolymer having an ethylene content of 72.0% and a melt index of 2.0 g/10 min./190° C. (hereinafter referred to simply as "EPR"), 3 parts by weight of endo-bicyclo-[2,2,1]-5-heptene-2,3-dicarboxylic anhydride and 1 part by weight of di-tert-butylperoxide were mixed by a Henschell mixer at room temperature, and the mixture was supplied to a single screw extruder and extruded at 200° C. to obtain cylindrical pellets having a diameter of 2 mm and a length of 3 mm, whereby an acid anhydride-containing olefin copolymer was obtained. A polyarylate obtained from a bisphenol A and a 1/1 mixture of terephthalic acid/isophthalic acid (U-polymer, U-100, manufactured by Unitika Limited), nylon 6 (A 1030 BRL, manufactured by Unitika Limited) as a polyamide, an ethylene-glycidyl metharylate-vinyl acetate copolymer (Bondfast E, manufactured by Sumitomo Chemical Co., Ltd.) as an epoxy group-containing olefin copolymer and the above modified EPR as an acid anhydride-containing olefin copolymer, were mixed at the proportions as identified in Table 1, and the mixture was dried at 80° C. under vacuum overnight, and pelletized by a double screw extruder at 270° C. The pellets thus obtained were injection-molded to obtain test pieces, which were then subjected to the measurement of physical properties. The results thus obtained are shown in Table 1.

TABLE 1

Blend composition and physical properties

| | Weight ratio of polyarylate/ Nylon 6 | Weight ratio of olefin copolymers Bondfast E/ modified EPR | % by weight of the olefin copolymers in the resin resin composition | Izod impact strength ($\frac{1}{8}$", notched kg · cm/cm) | Heat distortion temperature (°C.) (Load: 18.5 kg/cm$^2$) | Abnormality |
|---|---|---|---|---|---|---|
| Comparative Example 1 | 50/50 | — | — | 7.0 | 150 | None |
| Comparative Example 2 | " | 10/0 | 10 | 30.4 | 135 | Gelation and coloring observed during pelletizing |
| Comparative Example 3 | " | " | 20 | 51.4 | 68 | |
| Comparative Example 4 | " | 0/10 | 10 | 17.4 | 139 | Inferior gloss and phase separation in the molded product |
| Comparative Example 5 | " | " | 20 | 14.2 | 123 | |
| Example 1 | " | 5/5 | 5 | 31.7 | 149 | None |
| Example 2 | " | " | 10 | 37.2 | 137 | |
| Example 3 | " | " | 20 | 66.2 | 123 | |
| Example 4 | " | " | 30 | 84.6 | 117 | |
| Example 5 | 50/50 | 3/7 | 10 | 36.4 | 138 | None |
| Example 6 | " | " | 20 | 72.5 | 122 | |

TABLE 1-continued

| | | Blend composition and physical properties | | | | |
|---|---|---|---|---|---|---|
| | Weight ratio of polyarylate/ Nylon 6 | Weight ratio of olefin copolymers Bondfast E/ modified EPR | % by weight of the olefin copolymers in the resin resin composition | Izod impact strength (⅛", notched kg · cm/cm) | Heat distortion temperature (°C.) (Load: 18.5 kg/cm$^2$) | Abnormality |
| Example 7 | " | 7/3 | 10 | 35.7 | 138 | None |
| Example 8 | " | " | 20 | 62.8 | 122 | |

EXAMPLES 9 to 15

The same polyarylate as used in Examples 1 to 8, an isophthalic acid-lauryllactam-bis(4-amino-3-methylcyclohexyl)methane copolymer, polyamide (TR-55, manufactured by EMS Company), the same epoxy group-containing olefin copolymer as used in Examples 1 to 8 and Keltaflex N 35 (manufactured by DSM Company) as an acid anhydride-containing olefin copolymer, were mixed at the proportions as identified in Table 2, and the mixture was molded in the same manner as in Examples 1 to 8 to obtain test pieces, which were subjected to the measurement of physical properties. The results thus obtained are shown in Table 2.

EXAMPLES 16 to 23

The same polyarylate as used in Examples 1 to 8, the same polyamide as used in Examples 1 to 8, the same epoxy group-containing olefin copolymer as used in Examples 1 to 8, an ethylene-maleic anhydride-acrylate copolymer (Bondain LX 4110, manufactured by Sumica CDF) as an acid anhydride-containing olefin copolymer were mixed at the proportions as identified in Table 3, and the mixture was dried overnight at 80° C. under vacuum, and then pelletized by a double screw extruder at 270° C. The pellets thus obtained were injection-molded to obtain test pieces, which were subjected to the measurement of physical properties. The results thus obtained are shown in Table 3.

TABLE 2

| | Blend composition and physical properties | | | | | |
|---|---|---|---|---|---|---|
| | Weight ratio of polyarylate/ copolyamide | Weight ratio of olefin copolymers Bondfast E/ Keltaflex N 35 | % by weight of the olefin copolymers in the resin resin composition | Izod impact strength (⅛", notched kg · cm/cm) | Heat distortion temperature (°C.) (Load: 18.5 kg/cm$^2$) | Abnormality |
| Comparative Example 6 | 40/60 | — | — | 12 | 162 | None |
| Comparative Example 7 | " | 10/0 | 20 | 41 | 141 | Gelatin and coloring observed during pelletizing |
| Comparative Example 8 | " | 0/10 | 20 | 21 | 142 | Inferior gloss and phase separation in the molded product |
| Example 9 | " | 5/5 | 20 | 87 | 146 | None |
| Comparative Example 9 | 50/50 | — | — | 14 | 166 | None |
| Example 10 | " | 5/5 | 20 | 76 | 148 | None |
| Example 11 | 50/50 | 3/7 | 20 | 78 | 149 | None |
| Example 12 | " | 7/3 | 20 | 94 | 146 | None |
| Example 13 | 60/40 | 5/5 | 20 | 80 | 150 | None |
| Example 14 | " | 3/7 | 20 | 73 | 155 | None |
| Example 15 | " | 7/3 | 20 | 76 | 155 | None |

TABLE 3

| | Blend composition and physical properties | | | | | |
|---|---|---|---|---|---|---|
| | Weight ratio of polyarylate/ Nylon 6 | Weight ratio of olefin copolymers Bondfast E/ Bondain LX 4110 | % by weight of the olefin copolymers in the resin resin composition | Izod impact strength (⅛", notched kg · cm/cm) | Heat distortion temperature (°C.) (Load: 18.5 kg/cm$^2$) | Abnormality |
| Comparative Example 1 | 50/50 | — | — | 7.0 | 150 | None |
| Comparative Example 2 | " | 10/0 | 10 | 30.4 | 135 | Gelatin and coloring observed during pelletizing |
| Comparative Example 3 | " | " | 20 | 51.4 | 68 | |

TABLE 3-continued

Blend composition and physical properties

| | Weight ratio of polyarylate/ Nylon 6 | Weight ratio of olefin copolymers Bondfast E/ Bondain LX 4110 | % by weight of the olefin copolymers in the resin resin composition | Izod impact strength (⅛", notched kg · cm/cm) | Heat distortion temperature (°C.) (Load: 18.5 kg/cm$^2$) | Abnormality |
|---|---|---|---|---|---|---|
| Comparative Example 10 | " | 0/10 | 10 | 21.0 | 138 | Inferior gloss and |
| Comparative Example 11 | " | " | 20 | 19.6 | 121 | phase separation in the molded product |
| Example 16 | " | 5/5 | 5 | 32.1 | 148 | None |
| Example 17 | " | " | 10 | 36.8 | 137 | |
| Example 18 | " | " | 20 | 64.8 | 120 | |
| Example 19 | " | " | 30 | 89.4 | 115 | |
| Example 20 | 50/50 | 3/7 | 10 | 37.2 | 136 | None |
| Example 21 | " | " | 20 | 67.3 | 119 | |
| Example 22 | " | 7/3 | 10 | 34.2 | 137 | None |
| Example 23 | " | " | 20 | 63.8 | 121 | |

EXAMPLES 24 to 29

The same polyarylate as used in Examples 1 to 8, the same copolymer polyamide as used in Examples 9 to 15, the same epoxy group-containinig olefin copolymer as used in Examples 1 to 8, an ethylene-maleic anhydride-acrylic acid copolymer (Bondain AX 8040, manufactured by Sumica CDF) were mixed at the proportions as identified in Table 4, and the mixture was molded in the same manner as in Examples 1 to 8 to obtain test pieces, which were subjected to the measurement of physical properties. The results thus obtained are shown in Table 4.

measured at 25° C. at a concentration of 1 g/dl in phenol/tetrachloroethane =60/40 by weight ratio), the same polyamide as used in Examples 1 to 8, an ethylene glycidyl metharylate copolymer (Bondfast 2C, manufactured by Sumitomo Chemical Co., Ltd.) as an epoxy group-containing olefin copolymer, an ethylene-maleic anhydride-acrylate copolymer (Bondain FX 8000, manufactured by Sumica CDF) as an acid anhydride-containing olefin copolymer were mixed at the proportions as identified in Table 5, and the mixture was dried at 80° C. under vacuum overnight, and then injection-molded by a double screw extruder at 270° C. to obtain test pieces, which were then subjected to the measurement

TABLE 4

Blend composition and physical properties

| | Weight ratio of polyarylate/ copolyamide | Weight ratio of olefin copolymers Bondfast E/ Bondain AX 8040 | % by weight of the olefin copolymers in the resin resin composition | Izod impact strength (⅛", notched kg · cm/cm) | Heat distortion temperature (°C.) (Load: 18.5 kg/cm$^2$) | Abnormality |
|---|---|---|---|---|---|---|
| Comparative Example 6 | 40/60 | — | — | 12 | 162 | None |
| Comparative Example 7 | " | 10/0 | 20 | 41 | 141 | Gelatin and coloring observed during pelletizing |
| Comparative Example 12 | " | 0/10 | 20 | 24 | 143 | Inferior gloss and phase separation in the molded product |
| Example 9 | " | 5/5 | 20 | 84 | 144 | None |
| Comparative Example 9 | 50/50 | — | — | 14 | 166 | None |
| Example 24 | " | 5/5 | 20 | 87 | 146 | None |
| Example 25 | " | 3/7 | 20 | 74 | 149 | None |
| Example 26 | 50/50 | 7/3 | 20 | 98 | 144 | None |
| Example 27 | 60/40 | 5/5 | 20 | 76 | 149 | None |
| Example 28 | " | 3/7 | 20 | 72 | 154 | None |
| Example 29 | " | 7/3 | 20 | 71 | 153 | None |

EXAMPLES 30 to 33

A polyarylate obtained from bisphenol and a isophthalic acid (logarithmic viscosity number: 0.60 as of physical properties. The results thus obtained are shown in Table 5.

TABLE 5

Blend composition and physical properties

| | Weight ratio of polyarylate/Nylon 6 | Weight ratio of olefin copolymers Bondfast 2C/Bondain FX 8000 | % by weight of the olefin copolymers in the resin resin composition | Izod impact strength (⅛", notched kg · cm/cm) | Heat distortion temperature (°C.) (Load: 18.5 kg/cm²) | Abnormality |
|---|---|---|---|---|---|---|
| Comparative Example 13 | 50/50 | — | — | 6.0 | 155 | None |
| Comparative Example 14 | " | 10/0 | 20 | 37 | 69 | Gelation and coloring observed during pelletizing |
| Comparative Example 15 | " | 0/10 | 20 | 23 | 144 | Inferior gloss and phase separation in the molded product |
| Example 30 | " | 5/5 | 20 | 64 | 144 | None |
| Example 31 | " | 3/7 | 20 | 67 | 146 | None |
| Example 32 | " | 7/3 | 20 | 65 | 144 | None |
| Example 33 | " | 5/5 | 10 | 39 | 150 | None |

As shown in Tables 1 to 5, when an epoxy group-containing olefin copolymer is incorporated alone to the resin composition comprising a polyarylate and a polyamide, gelation or coloring takes place during pelletizing, and the decrease of the thermal distortion temperature is substantial. On the other hand, when an acid anhydride-containing olefin copolymer is used alone, the effect for the improvement of the impact strength is small, and the gloss on the surface of the molded product diminishes.

Whereas, the resin composition of the present invention is free from such drawbacks inherent in the cases where the impact resistance imparting materials are used alone individually. It is surprising that the impact strength is remarkably improved by the present invention over the case where the materials are used alone individually.

We claim:

1. A resin composition which comprises a resin blend comprising from 10 to 70% by weight of a polyarylate and from 30 to 90% by weight of a polyamide, and (A) an epoxy group-containing olefin copolymer obtained by copolymerizing at least one unsaturated glycidyl monomer with at least one olefin unsaturated monomer and (B) an acid anhydride-containing olefin copolymer obtained by copolymerizing a polyolefin or an olefin copolymer with an unsaturated dicarboxylic anhydride, incorporated in a total amount of (A) and (B) of from 3 to 30% by weight to said resin blend,
   wherein the equivalent ratio of the epoxy group contained in the epoxy group-containing olefin copolymer to the acid anhydride contained in the acid anhydride-containing olefin copolymer is within a range of from 1:9 to 9:1,
   and wherein the amount of unsaturated glycidyl monomer in the epoxy group-containing olefin copolymer is from 0.1 to 50 mol %, and the amount of unsaturated dicarboxylic acid anhydride in the acid anhydride-containing olefin copolymer is 0.1 to 50 mol %.

2. The resin composition according to claim 1, wherein the epoxy group-containing olefin copolymer is an ethylene-glycidyl methacrylate copolymer or an ethylene-glycidyl acrylate copolymer.

3. The resin composition according to the claim 1, wherein the epoxy group-containing olefin coplymer is an ethylene-glycidyl methacrylate-vinyl acetate copolymer or an ethylene-glycidyl acrylate-vinyl acetate copolymer.

4. The resin composition according to claim 1, wherein the acid anhydride-containing olefin copolymer is a copolymer of an ethylene-propylene copolymer or an ethylene-propylene-diene copolymer with an endo-bicyclo-[2,2,1]-5-heptene-2,3-dicarboxylic acid anhydride.

5. The resin composition according to claim 1, wherein the acid anhydride-containing olefin copolymer is a copolymer of an ethylene-propylene copolymer or an ethylene-propylene-dien copolymer with maleic anhydride.

6. The resin composition according to claim 1, wherein the acid anhydride-containing olefin copolymer is a copolymer of an ethylene-acrylate with maleic anhydride.

7. The resin composition according to claim 1, wherein the acid anhydride-containing olefin copolymer is a copolymer of an ethylene-methacrylate copolymer with maleic anhydride.

8. The resin composition according to claim 1, wherein the polyarylate is obtained from bisphenol A and terephthalic acid and/or isophthalic acid.

9. The resin composition according to claim 1, wherein the polyamide is at least one member selected from the group consisting of nylon 6, nylon 6,6, and nylon 4,6.

* * * * *